(12) United States Patent
Dlugoss et al.

(10) Patent No.: US 8,886,423 B1
(45) Date of Patent: Nov. 11, 2014

(54) SLIP CONTROL OF A BINARY CLUTCH ASSEMBLY

(71) Applicant: GM Global Technology Operations LLC, Detroit, MI (US)

(72) Inventors: Randall B. Dlugoss, Royal Oak, MI (US); Matthew Pruski, Brighton, MI (US); Dara Monajemi, Lansing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/032,468

(22) Filed: Sep. 20, 2013

(51) Int. Cl.
*G06F 7/00* (2006.01)
*F16H 3/44* (2006.01)
*B60W 10/11* (2012.01)
*B60W 10/02* (2006.01)

(52) U.S. Cl.
CPC .............. *B60W 10/02* (2013.01); *B60W 10/11* (2013.01)
USPC ........................................... 701/54; 475/292

(58) Field of Classification Search
USPC ........................................... 701/54; 475/292
See application file for complete search history.

(56) References Cited

U.S. PATENT DOCUMENTS

| 2009/0111643 | A1* | 4/2009 | Sah et al. | 477/5 |
| 2009/0118936 | A1* | 5/2009 | Heap et al. | 701/54 |
| 2011/0184613 | A1* | 7/2011 | Fujii et al. | 701/54 |

* cited by examiner

*Primary Examiner* — Edwin A Young
(74) *Attorney, Agent, or Firm* — Quinn Law Group, PLLC

(57) ABSTRACT

A vehicle includes an engine, an engine control module (ECM), and a transmission assembly. The transmission assembly includes a transmission control module (TCM), a stationary member, gear sets, an input member connected to the engine and one of the gear sets, and a binary clutch assembly. The binary clutch assembly has a freewheeling element and a binary device preventing rotation of the binary clutch assembly when applied, and allows the binary clutch assembly to freewheel when released. The TCM controls a slip speed differential of the binary clutch assembly when the vehicle is coasting in a forward gear state. The TCM determines a threshold maximum slip speed differential, calculates a required engine speed for achieving no more than the threshold maximum, and transmits the required engine speed to the ECM to maintain engine speed at or above the required engine speed. Doing so enables transmission state and direction change flexibility.

16 Claims, 2 Drawing Sheets

SLIP CONTROL OF A BINARY CLUTCH ASSEMBLY

TECHNICAL FIELD

The disclosure relates to the slip control of a binary clutch assembly.

BACKGROUND

In a motor vehicle transmission, rotatable transmission input and output members are selectively coupled using interconnected gear elements and clutches in a range of transmission output speed ratios. Some of the clutches may be fluid-actuated plate clutches having a series of spaced friction plates. A hydraulic piston may be used to compress the friction plates together and thereby transfer torque across the engaged clutch, or to stop rotation of a side of the clutch and any interconnected gear elements or nodes. Plate clutches are typically controlled with a variable rate of slip such that the state of the plate clutch can range from fully-applied to fully-released, as well as anywhere in between these two states.

In some transmissions, a binary clutch assembly is used in lieu of a plate clutch to connect some gear elements or nodes of the transmission. A typical binary clutch assembly includes a freewheeling element and an on/off binary device such as a selectable one-way clutch (SOWC). Unlike conventional friction plate clutches, a binary clutch assembly has just two possible clutch states: fully-applied and fully-released. When the binary device is released, the binary clutch assembly freewheels in one rotational direction while the freewheeling element prevents rotation in the other rotational direction. Application of the binary device effectively locks the binary clutch assembly in both rotational directions.

SUMMARY

A vehicle is disclosed herein that includes a transmission having a binary clutch assembly. The transmission, which receives input torque from an engine or another prime mover, includes one or more gear sets, at least two gear elements or nodes of which are connected via the binary clutch assembly. The binary clutch assembly may be any torque transfer device having only the two states noted above: fully-applied and fully-released, i.e., any torque transfer mechanism characterized by an absence of a partially-applied state. A control system is in communication with the binary clutch assembly, and includes a transmission control module (TCM) and an engine control module (ECM). The TCM is configured to enforce a lower limit threshold engine speed when the binary clutch assembly is not engaged, such as during coasting. This occurs via engine speed requests transmitted by the TCM to the ECM. In this manner, a calibrated amount of slip is maintained across the binary clutch assembly, such that entry is permitted into reverse or neutral from higher vehicle speeds relative to conventional approaches.

The vehicle according to an example embodiment may include an internal combustion engine, the ECM, the TCM, and a transmission assembly. In such an embodiment, the transmission assembly may include a stationary member, a plurality of gear sets, the transmission input member, and the binary clutch assembly. Each gear set may have a plurality of nodes, i.e., gear elements such as a ring gear, a sun gear, and a carrier member.

The binary clutch assembly includes a freewheeling element that holds torque across the binary clutch assembly only in a first rotational direction, and a binary device that, when engaged, prevents rotation of the binary clutch assembly in a second rotational direction. The binary device allows the binary clutch assembly to freewheel in the second rotational direction when the binary device is released. The binary device may be embodied as a selectable one-way clutch in an example embodiment.

The TCM, which is in communication with the ECM and with the binary clutch assembly over a controller area network (CAN) bus or other suitable network connection, includes a processor and memory on which is recorded instructions for controlling a slip speed differential across the binary clutch assembly when the vehicle is coasting and the transmission is in a forward gear state, e.g., when coasting in first gear. The instructions are executed by the processor of the TCM to enable the TCM to determine a threshold maximum value of the slip speed differential, calculate a required engine speed for achieving no more than threshold maximum value, and transmit the required engine speed to the ECM. In this manner, the TCM can request that the ECM maintain the speed of the engine at or above a level of the required engine speed. The TCM may detect a requested shift of the transmission into reverse or neutral from first gear, and then command engagement of the binary device in response to the requested shift.

A transmission assembly is also disclosed for use with the vehicle noted above. The transmission assembly includes the stationary member, the plurality of gear sets, the binary clutch assembly, the TCM, and the transmission input member.

A method of controlling a slip speed differential of the binary clutch assembly includes determining a threshold maximum value of the slip speed differential of the binary clutch assembly when the vehicle is coasting and the transmission is in a forward gear state. The method also includes calculating a required engine speed for achieving no more than threshold maximum value, and then transmitting the required engine speed to the ECM to thereby request that the ECM maintain the speed of the engine, via the engine control signals, at or above a level of the required engine speed.

The above features and the advantages of the present disclosure are readily apparent from the following detailed description of the best modes for carrying out the invention when taken in connection with the accompanying drawings.

DETAILED DESCRIPTION

Figure 1:
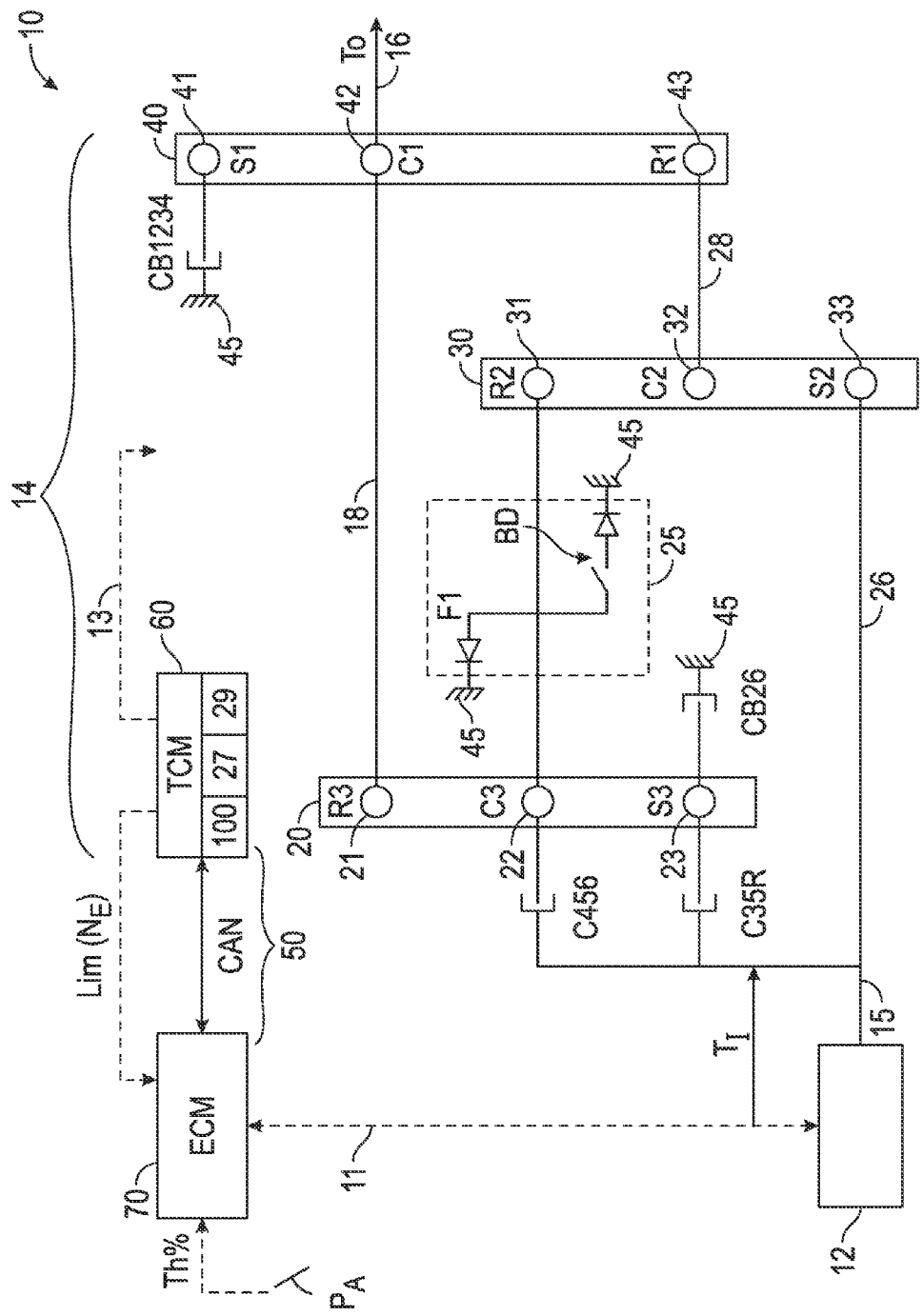
FIG. 1 is a schematic illustration of an example vehicle having an automatic transmission with a binary clutch assembly, with a slip speed differential across the binary clutch assembly being selectively controlled using engine speed requests as disclosed herein.

Referring to the drawings, an example vehicle 10 is shown schematically in FIG. 1. The vehicle 10 includes an internal combustion engine 12 or other prime mover, and an automatic transmission 14 having a binary clutch assembly 25. The transmission 14 is shown schematically in lever diagram form. The vehicle 10 also includes a control system 50 having a transmission control module (TCM) 60 and an engine control module (ECM) 70. The control system 50 is programmed in software and equipped in hardware to selectively maintain a threshold speed of the engine 12 while the transmission 14 is in a forward drive state, e.g., $1^{st}$ gear, and the vehicle 10 is coasting.

Execution of a method 100 by the control system 50 is intended to reduce a slip speed differential across the binary clutch assembly 25 in preparation for a coasting shift into neutral or reverse, with the term "slip speed differential" as used herein describing a difference in rotational speed across the binary clutch assembly 25. The method 100 can therefore enable earlier entry into neutral or reverse from higher vehicle speeds than is possible using conventional control approaches. An example method 100 for accomplishing this desired result is described below with reference to FIGS. 2 and 3.

The method 100 disclosed herein may be used with the example transmission 14 of FIG. 1 as well as with other transmission designs using a binary clutch assembly similar to the binary clutch assembly that is shown at 25 in FIG. 1. Regardless of how the transmission 14 is configured, at least two gear elements or nodes of the transmission 14 are connected to the binary clutch assembly 25. The control system 50, primarily via actions of the TCM 60, provides continuous control over engine speed while the vehicle 10 is coasting in a forward drive gear so that a driver does not have to wait for the vehicle 10 to come to a complete stop or nearly so before entering neutral or reverse. The approach set forth herein also departs from conventional approaches which leave the binary clutch on at all times in first gear. The present approach may be particularly beneficial during a forward-reverse vehicle rock cycle of the type commonly used in attempts to free a vehicle from snow, ice, or mud.

The TCM 60 and ECM 70 of FIG. 1 may be embodied as digital computer devices, and may communicate with each other over a controller area network (CAN) bus or other suitable network. Structurally, the TCM 60 may include a processor 27 along with sufficient tangible, non-transitory memory 29, e.g., read-only memory (ROM), flash memory, optical memory, additional magnetic memory, etc. The TCM 60 may also include any required random access memory (RAM), electrically-programmable read only memory (EPROM), a high-speed clock, analog-to-digital (A/D) and/or digital-to-analog (D/A) circuitry, and any input/output circuitry or devices, as well as any appropriate signal conditioning and buffer circuitry.

Instructions for executing the method 100 are recorded in the memory 29 and executed as needed via the processor(s) 27, with the TCM 60 ultimately outputting binary clutch control signals (arrow 13) to the transmission 14 and lower engine speed limit requests, indicated as $LIM(N_E)$, to the ECM 70. Although omitted for simplicity from FIG. 1, the ECM 70 may include similar hardware components as the TCM 60. The ECM 70 may also receive a throttle request (Th %) from an accelerator pedal ($P_A$) as shown, and thus the ECM 70 remains in control of typical engine functions via a set of engine control signals (arrow 11), as is well understood in the art.

The example transmission 14 of FIG. 1 may include an input member 15 carrying input torque (arrow $T_I$) from the engine 12 into the transmission 14, and an output member 16 carrying output torque ($T_O$) from the transmission 14 to the drive wheels (not shown). The respective input and output members 15 and 16 are selectively connected to each other at a desired speed ratio via one or more gear sets.

In the embodiment of FIG. 1, the transmission 14 is shown as an example 6-speed automatic transmission having three planetary gear sets, i.e., a first gear set 20, a second gear set 30, and a third gear set 40. However, as noted above other configurations may be used without departing from the intended inventive scope. The first gear set 20 may include first, second, and third nodes 21, 22, and 23, respectively. The nodes 21, 22, and 23 may be optionally embodied as a ring gear (R3), a carrier member (C3), and sun gear (S3). The second and third gear sets 30 and 40 may likewise have respective first, second, and third nodes. For the second gear set 30, the first, second, and third nodes are nodes 31, 32, and 33, respectively, which may be a ring gear (R2), a carrier member (C2), and a sun gear (S2) in one embodiment. The third gear set 40 includes respective first, second, and third nodes 41, 42, and 43, e.g., a sun gear (S1), a carrier member (C1), and a ring gear (R1).

With respect to the first gear set 20, the first node 21 is continuously connected to the second node 42 of the third gear set 40 via an interconnecting member 18. The second node 22 is selectively connected to the engine 12 and the input member 15 via a first rotating clutch C456. Likewise, the third node 23 is selectively connected to the engine 12 and the input member 15 via a second rotating clutch C35R. The third node 23 is selectively connected to a stationary member 45 of the transmission via a first braking clutch CB26. As used herein for all clutches, the letter "C" refers to "clutch", "B" refers to "brake", and the various numbers refer to the particular forward drive gear modes, e.g., "R" is reverse, "1" is $1^{st}$ gear, "2" represents $2^{nd}$ gear, etc., all the way up to $6^{th}$ gear. The absence of a "B" in the clutch designation indicates that the particular clutch is a rotating clutch.

In the second gear set 30 of FIG. 1, the first node 31 is selectively connected to the second node 22 of the first gear set 20 via the binary clutch assembly 25. The binary clutch assembly 25 includes a freewheeling element F1 and an on/off binary device (BD), e.g., a selectable one-way clutch (SOWC) or a dog clutch. The freewheeling element F1 and the binary device (BD) selectively connect to a stationary member 45 of the transmission 14. Engagement of the binary device (BD) of the binary clutch assembly 25 locks nodes 22 and 31 to the stationary member 45. The second node 32 is continuously connected to the third node 43 of the third gear set 40 via another interconnecting member 28. The third node 33 is continuously connected to the input member 15 via another interconnecting member 26. The first node 41 of the third gear set 40 is selectively connected to the stationary member 45 via a second braking clutch CB1234.

The vehicle 10 of FIG. 1 may use the binary clutch assembly 25 when shifting to a reverse gear state, e.g., during a rolling garage shift as that term is known in the art, as well as when shifting from $1^{st}$ gear to $2^{nd}$ gear. The binary clutch assembly 25 is typically in an off/released state and thus freewheeling in one rotational direction in all gear states above $2^{nd}$ gear in order to reduce slip losses in these higher gears. As noted above, the binary clutch assembly 25 has two parts as shown in FIG. 1: the passive one-way clutch or freewheeling element F1, which allows rotation of the node connected to it, such as node 31 of the second gear set 30, in only rotational direction, and the SOWC or binary device (BD). The binary device (BD) is selectively applied to prevent rotation of the binary clutch assembly 25 in both rotational directions. Hence, by applying the binary device (BD), any nodes connected to the binary device (BD) are effectively grounded to the stationary member 45.

Figure 2:
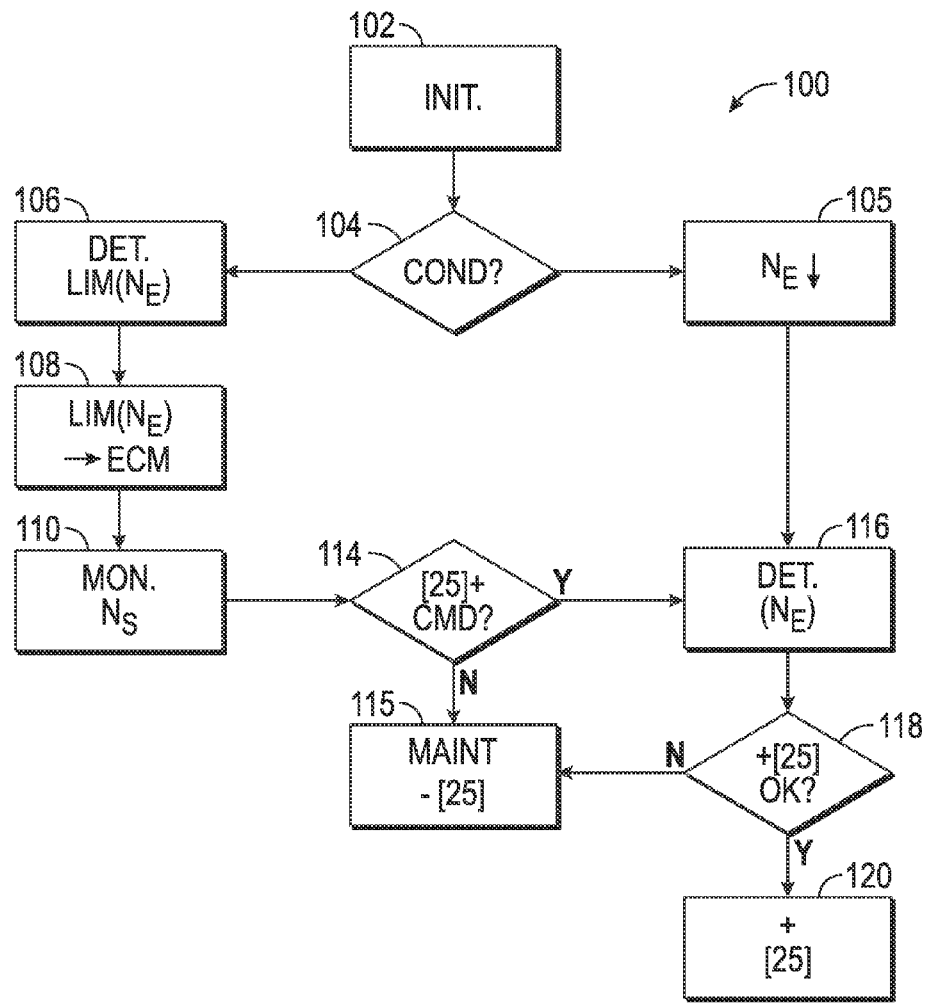
FIG. 2 is a flow chart describing an example method for controlling the slip speed across the binary clutch assembly using such engine speed requests.

Referring to FIG. 2, the method 100 is intended to be used to continuously monitor slip across the binary device (BD) of the binary clutch assembly 25 shown in FIG. 1 at a certain time, specifically while the vehicle 10 is coasting and the transmission 14 is in a forward drive state such as $1^{st}$ gear. The TCM 60 may request an increase in engine speed from the ECM 70 over the CAN bus to maintain the slip speed differential across the binary device (BD) below a calibrated slip threshold. With slip held at a threshold low level, a driver of the vehicle 10 can freely enter neutral or reverse when requested, as opposed to having to wait after a requested shift for the vehicle 10 to eventually slow to a stop. Engagement of the binary device (BD) can then occur without excessive force being imparted to the struts, sprags, or other torque transmitting elements (not shown) used therein.

An example embodiment of the method 100 begins with step 102, wherein the TCM 60 of FIG. 1 initializes. Step 102 may entail clearing the memory 29 and any associated buffers of the TCM 60 in anticipation of required active control of the binary clutch assembly 25 during coasting. The method 100 then proceeds to step 104.

At step 104, the TCM 60 determines whether certain conditions are present that require control of engine speed. Step 104 may entail evaluating the changing vehicle speed, transmission gear shifter (PRNDL) settings, driver pedal positions, engine speed threshold, etc., in order to determine if a shift of the binary device (BD) is required that would warrant further execution of the control steps. Part of step 104 may be the determination that the transmission 14 of FIG. 1 is presently in $1^{st}$ gear, although entry into reverse or neutral from $2^{nd}$ gear may be desired in other embodiments if the transmission 14 and binary clutch assembly 25 are structurally capable of a shift maneuver at higher speeds. The method 100 proceeds to step 106 if the conditions are present. Otherwise, the method 100 proceeds to step 105.

Step 105 entails allowing the engine speed to decrease of its own accord, as indicated by $N_E\downarrow$ in FIG. 2. Reduction in engine speed will occur as the vehicle 10 coasts down from a higher forward gear speed. The method 100 proceeds to step 116 as engine speed continues to decrease without active control actions from the ECM 70.

At step 106, the TCM 60 of FIG. 1 determines a maximum slip speed differential value, e.g., a calibrated value which may be extracted from a lookup table in a possible embodiment, and also calculates a lower threshold engine speed limit, $LIM(N_E)$, for achieving this calibrated slip speed differential. For instance, the TCM 60 may measure the output speed of the transmission 14 at the output member 16 via a transmission output speed sensor (not shown), and may calculate the speeds of each of the nodes of the gear sets 20, 30, and 40 using a calibrated gear speed ratio.

The calibrated slip speed differential may be determined beforehand, and may be at a level that may vary with the design of the binary device (BD). A more robustly designed binary device (BD), for instance, may be less prone to shock during application, and thus may be engaged at higher relative slip speeds or forces. The TCM 60 can therefore readily determine the required engine speed for achieving the calibrated slip. Once calculated, the method 100 proceeds to step 108.

Step 108 entails transmitting the lower threshold engine speed limit, $LIM(N_E)$, from step 106 to the ECM 70, and then proceeding to step 110.

At step 110, the TCM 60 monitors the changing slip and driver inputs such as throttle level (Th %) while the ECM 70 controls engine speed, maintaining the engine speed above the lower threshold engine speed limit, $LIM(N_E)$. The method 100 then proceeds to step 114.

Step 114 includes determining whether or not engagement of the binary clutch assembly 25 of FIG. 1, specifically the binary device (BD), has been requested. Part of step 114 may include verifying that a driver has shifted a PRNDL device into reverse or neutral from a forward gear state. If so, the method 100 proceeds to step 116. Otherwise, the method 100 proceeds to step 115.

At step 115, the TCM 60 maintains the binary clutch assembly 25 in a disengaged state. The method 100 may start anew at step 102.

At step 116, the TCM 60 determines the engine speed ($N_E$), e.g., via information from the ECM 70, and then proceeds to step 118.

Step 118 entails determining if the binary clutch assembly 25 may be applied. Step 118 may include determining engagement operation thresholds, particularly that slip speed is minimal and that engine speed remains above the limit imposed at step 108. If so, the method 100 proceeds to step 120. Otherwise, the method 100 repeats step 115.

At step 120, the TCM 60 engages the binary clutch assembly 25, as indicated in FIG. 2 by "+[25]". The method 100 is then complete, and may repeat anew with step 102.

Figure 3:
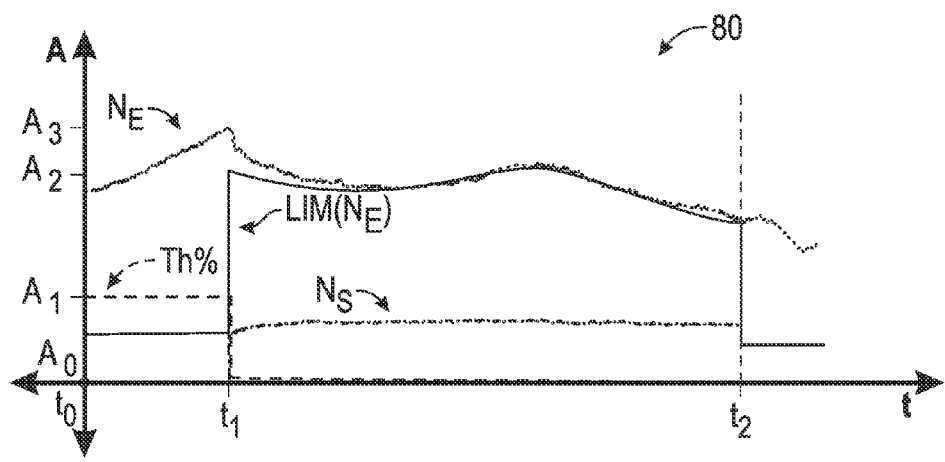
FIG. 3 is a time plot of a set of vehicle parameters including engine speed, throttle level, and slip speed that may be used in the execution of the method shown in FIG. 2.

Application of the above described method 100 may be seen in an example set of vehicle performance traces 80 as shown in FIG. 3. The binary clutch assembly 25 is disengaged through the $t_0$-$t_2$ duration. The binary clutch assembly 25 is engaged starting at $t_2$. Between $t_0$ and $t_1$, the vehicle 10 of FIG. 1 is driving in $1^{st}$ gear with positive throttle request (trace Th %). In this time period, engine speed (trace $N_E$) is rising gradually. At $t_1$, the driver may discontinue throttle request by releasing pressure from the accelerator pedal $P_A$ of FIG. 1. Engine speed (trace $N_E$) begins to fall as the vehicle 10 of FIG. 1 coasts. However, imposition of the lower speed limit on the engine speed (trace $N_E$) is provided by the TCM 60, via its communicated request to the ECM 70 as described in step 108 above, to maintain a relatively constant slip across the binary clutch assembly 25.

During the coasting duration $t_0$-$t_2$, engine speed (trace $N_E$) may run at or above a threshold corresponding to the lower threshold engine speed limit, $LIM(N_E)$, from step 110. Alternatively, engine speed (trace $N_E$) could rise and fall, effectively "bouncing" off of the lower threshold engine speed limit, i.e., $LIM(N_E)$, with the TCM 60 of FIG. 1 ensuring that the engine speed (trace $N_E$) never drops below the level of the lower threshold engine speed limit $LIM(N_E)$.

Between $t_1$ and $t_2$, slip speed (trace $N_S$) across the binary device (BD) of FIG. 1 may vary slightly, with the control of the engine speed (trace $N_E$) preventing slip from ever rising too high. Slip (trace $N_S$) is shown relatively stable in the example of FIG. 3. At $t_2$, the driver may request a shift to reverse or neutral, with such a requested shift requiring engagement of the binary clutch assembly 25 of FIG. 1. Use of the present method 100 thus may help to reduce shock imparted to the binary clutch assembly 25 when the binary device (BD) is engaged, regardless of whether the vehicle 10 is traveling at a higher rate of speed. In this manner, the present method 100 allows earlier entry into reverse or neutral relative to conventional methods in transmissions that use a binary clutch.

While the best modes for carrying out the invention have been described in detail, those familiar with the art to which this invention relates will recognize various alternative designs and embodiments for practicing the invention within the scope of the appended claims.

The invention claimed is:
1. A vehicle comprising:
an internal combustion engine;
an engine control module (ECM) operable to generate engine control signals and control a speed of the engine via the engine control signals; and a transmission assembly having:
  a stationary member;
  a plurality of gear sets each having a plurality of nodes, wherein the nodes for each of the plurality of gear sets include a ring gear, a sun gear, and a carrier member;
  a transmission input member that is continuously connected to the engine and to one of the plurality of gear sets;
  a binary clutch assembly having a freewheeling element which holds torque only in a first rotational direction and a binary device that, when engaged, prevents rotation of the binary clutch assembly in a second rotational direction, and that allows the binary clutch assembly to freewheel in the second rotational direction opposite the first rotational direction when released; and
  a transmission control module (TCM) in communication with the ECM and with the binary clutch assembly, wherein the TCM includes a processor and memory on which is recorded instructions for controlling a slip speed differential of the binary clutch assembly when the vehicle is coasting while the transmission is in a forward gear state, and wherein the controller is configured to execute the instructions from the memory via the processor to thereby:
    determine a threshold maximum value of the slip speed differential;
    calculate a required engine speed for achieving no more than threshold maximum value; and
    transmit the required engine speed to the ECM to thereby request that the ECM maintain the speed of the engine, via the engine control signals, at or above a level of the required engine speed.

2. The vehicle of claim 1, wherein the binary device is a selectable one way clutch or a dog clutch.

3. The vehicle of claim 1, wherein the forward gear state is first gear.

4. The vehicle of claim 3, wherein the TCM is further configured to detect a requested shift of the transmission into reverse or neutral from first gear, and to command engagement of the binary device in response to the requested shift.

5. The vehicle of claim 1, wherein the plurality of gear sets includes a first and a second gear set, and wherein the binary clutch assembly is connected between respective nodes of the first and second gear sets.

6. The vehicle of claim 5, wherein the respective nodes include a carrier member of the first gear set and a ring gear of the second gear set.

7. A transmission assembly for use with a vehicle having an internal combustion engine and an engine control module (ECM) which controls a speed of the engine via engine control signals, the transmission assembly comprising:
  a stationary member;
  a plurality of gear sets each having a plurality of nodes, wherein the nodes for each of the plurality of gear sets are one of a ring gear, a sun gear, and a carrier member;
  a transmission input member that is continuously connected to the engine and to one of the plurality of gear sets;
  a binary clutch assembly having a freewheeling element which holds torque only in a first rotational direction and a binary device that, when engaged, prevents rotation of the binary clutch assembly in a second rotational direction opposite the first rotational direction, and that allows the binary clutch assembly to freewheel in the second rotational direction when released; and
  a transmission control module (TCM) in communication with the ECM and with the binary clutch assembly, wherein the TCM includes a processor and memory on which is recorded instructions for controlling a slip speed differential of the binary clutch assembly when the vehicle is coasting while the transmission is in a forward gear state, and wherein the controller is configured to execute the instructions from the memory via the processor to thereby:
    determine a threshold maximum value of the slip speed differential;
    calculate a required engine speed for achieving no more than threshold maximum value; and
    transmit the required engine speed to the ECM to thereby request that the ECM maintain the speed of the engine, via the engine control signals, at or above a level of the required engine speed.

8. The transmission assembly of claim 7, wherein the binary device is a selectable one way clutch or a dog clutch.

9. The transmission assembly of claim 8, wherein the TCM is further configured to detect a requested shift of the transmission into reverse or neutral from first gear, and to command engagement of the binary device in response to the requested shift.

10. The transmission assembly of claim 7, wherein the forward gear state is first gear.

11. The transmission assembly of claim 7, wherein the plurality of gear sets includes a first and a second gear set, and wherein the binary clutch assembly is connected between respective nodes of the first and second gear sets.

12. The transmission assembly of claim 11, wherein the respective nodes include a carrier of the first gear set and a ring gear of the second gear set.

13. A method of controlling a slip speed differential of a binary clutch assembly in a vehicle having an internal combustion engine, an engine control module (ECM) which controls a speed of the engine via engine control signals, and a transmission assembly having a plurality of gear sets each having a plurality of nodes and a transmission input member that is continuously connected to the engine and to one of the plurality of gear sets, the method comprising:
  determining, via a transmission control module (TCM) of the vehicle, a threshold maximum value of the slip speed differential of the binary clutch assembly when the vehicle is coasting and the transmission is in a forward gear state, wherein the TCM is in communication with the ECM and with the binary clutch assembly, and wherein the binary clutch assembly has a freewheeling element which holds torque only in a first rotational direction with respect to a stationary member of the transmission, and a binary device that, when engaged, prevents rotation of the binary clutch assembly in a second rotational direction opposite the first rotational direction, and that allows the binary clutch assembly to freewheel in the second rotational direction when released;
  calculating a required engine speed for achieving no more than threshold maximum value; and
  transmitting the required engine speed to the ECM to thereby request that the ECM maintain the speed of the engine, via the engine control signals, at or above a level of the required engine speed.

14. The method of claim 13, wherein the binary device is a selectable one way clutch or a dog clutch, and the forward gear state is first gear, the method further comprising:
  detecting a requested shift of the transmission into reverse or neutral from first gear; and commanding engagement of the binary device in response to the requested shift.

15. The method of claim 14, wherein commanding engagement of the binary device includes commanding engagement of a selectable one-way clutch.

16. The method of claim 13, wherein the plurality of gear sets includes a first and a second gear set, and wherein the binary clutch assembly is connected between respective nodes of the first and second gear sets.

* * * * *